(12) United States Patent
Gould

(10) Patent No.: US 11,634,096 B2
(45) Date of Patent: Apr. 25, 2023

(54) SEAT-MOUNTED OCCUPANT RESTRAINT SYSTEM

(71) Applicant: ZF Passive Safety Systems US Inc., Washington, MI (US)

(72) Inventor: Douglas Gould, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/464,017

(22) Filed: Sep. 1, 2021

(65) Prior Publication Data

US 2023/0065114 A1    Mar. 2, 2023

(51) Int. Cl.
*B60R 21/013* (2006.01)
*B60R 21/207* (2006.01)

(52) U.S. Cl.
CPC .......... *B60R 21/013* (2013.01); *B60R 21/207* (2013.01)

(58) Field of Classification Search
None
See application file for complete search history.

(56) References Cited

U.S. PATENT DOCUMENTS

| 10,023,146 | B2 * | 7/2018 | Faruque | B60R 21/237 |
| 11,267,431 | B2 * | 3/2022 | Sekizuka | B60R 21/232 |
| 11,351,946 | B1 * | 6/2022 | Faruque | B60R 21/207 |
| 2017/0144622 | A1 * | 5/2017 | Perlo | B60R 21/237 |

FOREIGN PATENT DOCUMENTS

| DE | 102007017998 A1 * | 10/2008 | ......... B60R 21/207 |
| DE | 102015001198 A1 * | 8/2016 | ......... B60R 21/231 |
| DE | 102019008653 A1 * | 6/2021 | |

* cited by examiner

*Primary Examiner* — Faye M Fleming
(74) *Attorney, Agent, or Firm* — Tarolli, Sundheim, Covell & Tummino LLP

(57) ABSTRACT

A restraint system is provided for helping to protect an occupant of a vehicle having a roof and side structure defining a cabin with a seat for the occupant. The restraint system includes an airbag having a stored condition within the vehicle seat and being inflatable to deploy upwards in the cabin to a deployed condition between the occupant and the side structure. The airbag extends from an upper end positioned adjacent the roof to a lower end positioned adjacent a base of the seat. The airbag extends in a forward-rearward direction of the vehicle sufficient to span the entire depth of the seat in the forward-rearward direction.

19 Claims, 5 Drawing Sheets

SEAT-MOUNTED OCCUPANT RESTRAINT SYSTEM

TECHNICAL FIELD

The present invention relates generally to vehicle airbags and, in particular, relates to seat-mounted curtain airbags.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

SUMMARY

According to one aspect, a restraint is provided for helping to protect an occupant of a vehicle having a roof and side structure defining a cabin with a seat for the occupant. The restraint system includes an airbag having a stored condition within the vehicle seat and being inflatable to deploy upwards in the cabin to a deployed condition between the occupant and the side structure. The airbag extends from an upper end positioned adjacent the roof to a lower end positioned adjacent a base of the seat. The airbag extends in a forward-rearward direction of the vehicle sufficient to span the entire depth of the seat in the forward-rearward direction.

According to another aspect, a restraint system is provided for helping to protect an occupant of a vehicle having a roof and side structure defining a cabin with a seat for the occupant. The restraint system includes an airbag having a stored condition within a seat base of the seat and being inflatable to deploy upwards in the cabin to a deployed condition between the occupant and the side structure. The airbag extends from an upper end configured to engage the roof to a lower end extending into the seat base. The airbag extends in a forward-rearward direction of the vehicle sufficient to span the entire depth of the seat in the forward-rearward direction. At least one tether is connected to the lower end of the airbag for directing airbag deployment around the seat base.

In another aspect, taken alone or in combination with any other aspect, the airbag is stored within a base of the seat.

In another aspect, taken alone or in combination with any other aspect, the airbag is stored in a seatback of the seat.

In another aspect, taken alone or in combination with any other aspect, the airbag is stored in a head rest of the seat.

In another aspect, taken alone or in combination with any other aspect, at least one tether is connected to the lower end of the airbag for directing airbag deployment around the seat.

In another aspect, taken alone or in combination with any other aspect, the at least one tether includes multiple tethers each having first and second ends connected to interior surfaces of the airbag.

In another aspect, taken alone or in combination with any other aspect, each of the at least one tether extends in an inboard-outboard direction of the vehicle.

In another aspect, taken alone or in combination with any other aspect, the airbag is configured to use the seat as a reaction surface.

In another aspect, taken alone or in combination with any other aspect, the airbag is configured to use the vehicle side structure as a reaction surface.

In another aspect, taken alone or in combination with any other aspect, an airbag module includes the restraint system, a housing configured to be mounted in the vehicle seat and an inflator for providing inflation fluid for inflating the airbag.

In another aspect, taken alone or in combination with any other aspect, a sensor is provided for sensing the occurrence of an event for which deployment of the airbag is desired and producing a signal indicative thereof. A controller is connected to the sensor and, in response to receiving the signal, actuating an inflator to inflate the airbag to the deployed condition.

Other objects and advantages and a fuller understanding of the invention will be had from the following detailed description and the accompanying drawings.

DETAILED DESCRIPTION

Figure 1:
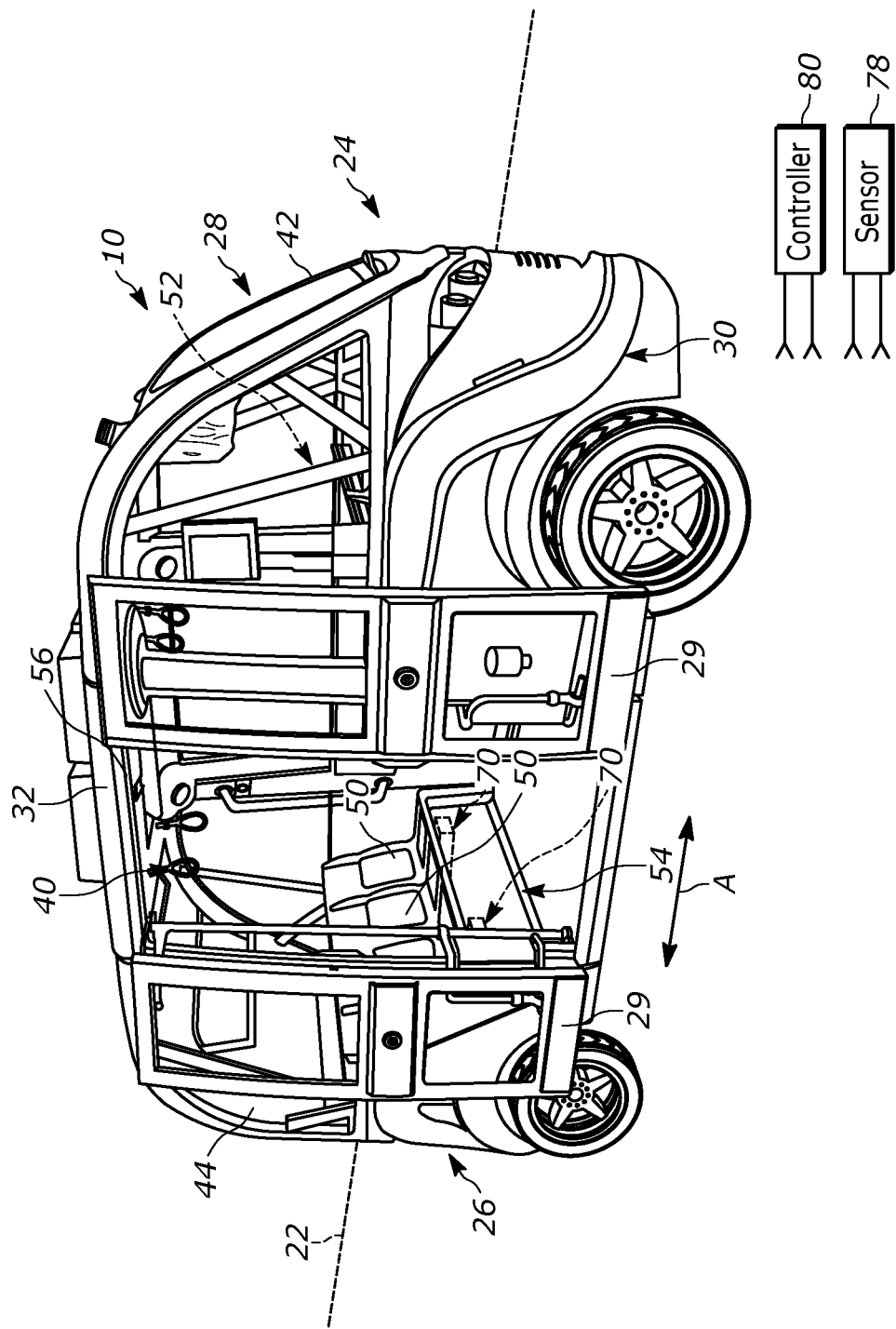
FIG. 1 is a schematic illustration of a vehicle including an example seat-mounted, occupant restraint system.
Figure 2:
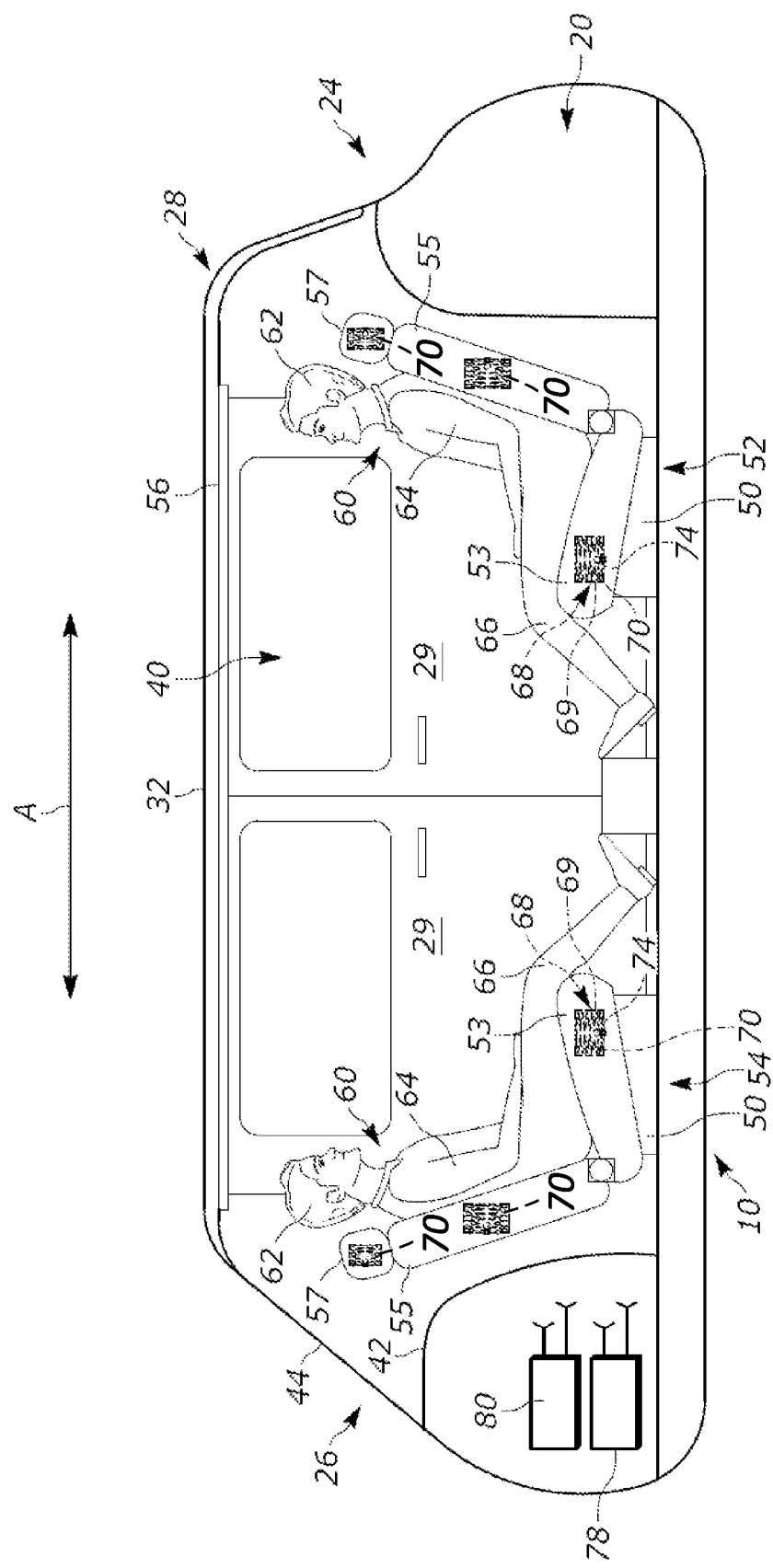
FIG. 2 is a schematic illustration of a cabin of the vehicle with an example airbag of the restraint system in a stored condition.

The present invention relates generally to vehicle airbags and, in particular, relates to seat-mounted airbags that rely on the seat for a reaction surface. FIGS. 1-2 illustrate an example vehicle safety system in the form of an occupant restraint system 10. In this example, the vehicle 20 is a fully autonomous vehicle, although other vehicle types, such as a driver-operated or semi-autonomous vehicle (not shown) are contemplated.

The vehicle 20 extends along a centerline 22 from a first or fore end 24 to a second or aft end 26. A roof 32 extends from the first end 24 to the second end 26. A front windshield or windscreen 42 is located at the first end 22. A rear windshield or windscreen 44 is located at the second end 24.

The vehicle 20 also extends to a left side 28 and a right side 30 on opposite sides of the centerline 22. The vehicle 20 includes side structure extending along the sides 28, 30, which can include the frame and one or more doors. In this example, a pair of double doors 29 is provided on each of the left side 28 and right side 30 of the vehicle 20.

The side structure (including the doors 29), roof 32, and windshields 42, 44 help to define a cabin or interior 40 of the vehicle 20. Since the vehicle 20 is fully autonomous, the cabin 40 is configured without operator controls, such as a steering wheel, pedals, instrumentation, center console, instrument panel, etc. in order to maximize the space in the cabin.

Each set of doors 29 is provided on a track 56 connected to a roof 32 of the vehicle 20. The doors 29 on each side 28, 30 are actuatable to move along the track 56 from a closed condition engaging one another to an open condition allowing for ingress/egress of the cabin 40. As shown, the doors 29 move away from one another along the track 56 to the open condition in the manner indicated at A. The doors 29 can be configured to swing, pivot, slide, fold, etc.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, having seats 50 that face each other. In other words, the front row 52 is rearward-facing and the rear row 54 is forward-facing. Alternatively, the seats 50 can be arranged in front and rear rows 52, 54 that are both forward-facing (not shown) similar to that of conventional automobiles. It will be appreciated that the vehicle 20 could alternatively include more or fewer rows of seats 50 (not shown).

Figure 3:
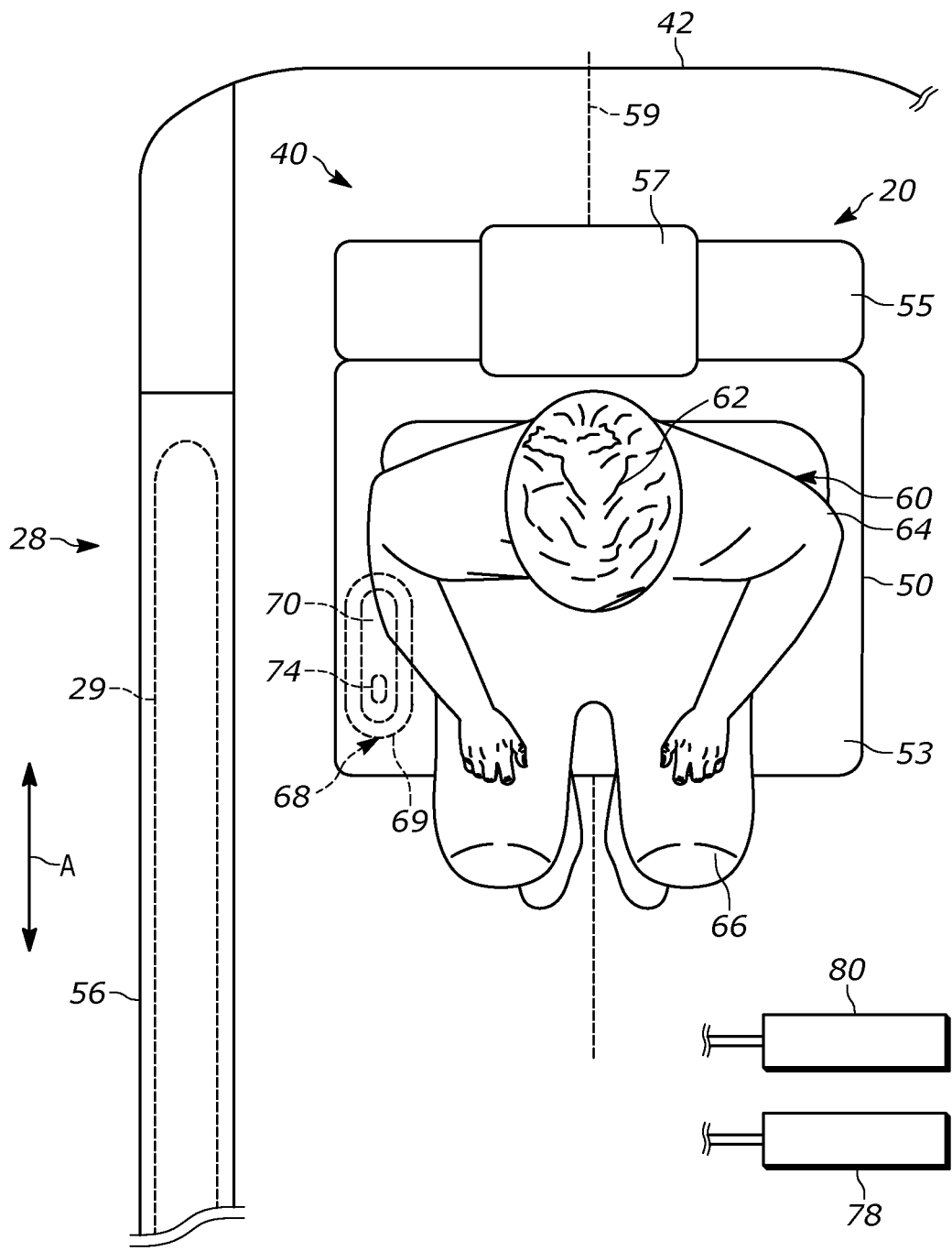
FIG. 3 is a top view of a seat with the airbag in the stored condition.

Regardless of the seating arrangement, each seat 50 extends along a fore-aft centerline 59 (see FIG. 3) and includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

It will be appreciated that one or more of the seats 50 can be configured to recline and/or rotate. More specifically, each seat 50 can be configured such that the seat back 55 is pivotable in the forward-rearward direction relative to the base 53. The entire seat 50 can also be rotatable about a fixed point on the vehicle floor to change the direction in which the seat faces within the cabin 40. In other words, the occupant 60 can rotate the seat 50 to face forward, rearward or positions therebetween.

In any of these seating arrangements or seat configurations, the vehicle 20 is configured to accommodate the doors 29 while maximizing the cabin 40 space such that the vehicle 20 deviates from typical vehicle constructions. To this end, the B-pillars typically found along the sides 28, 30 are omitted. Moreover, the roof 32 is generally thinner than traditional roofs in order to accommodate the track 56 and maximize the opening between the doors 29 to facilitate passenger ingress/egress.

That said, in the vehicle 20 there is no B-pillar in which to position a curtain airbag, and the reduced size of the roof 32 does not provide sufficient storage space for a curtain airbag module. It is therefore evident that the architecture of autonomous vehicles, including the vehicle 20 of the present invention, can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as a B-pillar, presents additional challenges.

To account for these challenges, the occupant restraint system 10 includes at least one vehicle occupant protection device in the form of an inflatable airbag 70 housed/concealed in the seats 50 behind, for example, seat upholstery. Mounting the airbags 70 in the seats 50 is convenient because each airbag can be positioned in a location with a desired proximity to the occupant(s) 60 it is intended to help protect. This can help reduce the necessary inflatable volume of the airbags 70 and can also help provide a desired airbag deployment time without requiring an excessively high-volume inflator.

The airbag 70 is stored in a module 68 having a housing 69 made of a durable material such as plastic or metal. In the example configuration of FIG. 2, the airbag modules 68 are mounted in the base 53 of each seat 50. Alternatively, the airbag modules 68 can be mounted in the seat back 57 or head rest 59. In each case, the airbag module 68 is positioned outboard of the centerline 59 in the forwardmost portion of the seat base 53 adjacent the lower legs/knees 66 of the occupant 60. By "forwardmost" it is meant the portion of the seat base 53 furthest from the occupants' upper torso 64 in the direction the occupant faces. Of course, each mounting location brings different challenges in terms of configuring the airbag module 68.

Mounting the modules 68 outboard of the centerline 59 allows for rapid deployment into a position extending between the seat 50 and the doors 29. Regardless of where the airbag 70 is mounted in the seat 50, the airbag inflates and deploys outboard of the seat 50 and upwards in the cabin 40 between the seat and the doors 29/rest of the side structure.

The airbag 70 is at least one of rolled and folded before being placed in the housing 69 of the module 68. The module 68 is then placed within the base 53 of the seat 50 and covered with the seat upholstery and/or a door. Alternatively, the housing 69 can be secured to the exterior of the base 53 via brackets (not shown). Regardless, the occupant restraint system 10 also includes an inflator 74 positioned in each module 68 for providing inflation fluid to each airbag 70. The inflators 74 are operatively connected (e.g., by wires) to an airbag controller 80 (see FIG. 2) that includes or communicates with one or more crash sensors 78. The airbag controller 80 is operative to determine via the crash sensors 78 the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided in the seats 50 in each row 52, 54 that are adjacent to the doors 29. In other words, the seats 50 in each row 52, 54 that are furthest from the centerline 22 of the vehicle 20 in each of the left side 28 and right side 30. Each airbag 70 is positioned in the base 53 of the seat 50 outboard of the centerline 59 associated with that seat (see FIG. 3). Although the airbags 70 within each seat 50 are identical for each row provided in the vehicle 20, the construction and operation of only the airbag associated with seat 50 on the left side 28 and in the front row 52 is discussed for brevity.

The airbag 70, when inflated, helps protect the left side 28 occupant 60 in the front row 52 in the event of an impact to the vehicle 12, a vehicle rollover, or both. The airbag 70, when inflated, also helps absorb the energy of impacts with the airbag and helps distribute the impact energy over a large area thereof.

As shown in FIG. 2, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the housing 69, which causes both the housing and the seat upholstery to open (e.g., via tear seam or door). This releases the airbag 70 to inflate and deploy from its stored condition behind the seat upholstery to a deployed condition extending between the seat 50 and side structure, including the door 29 adjacent thereto.

Figure 4:
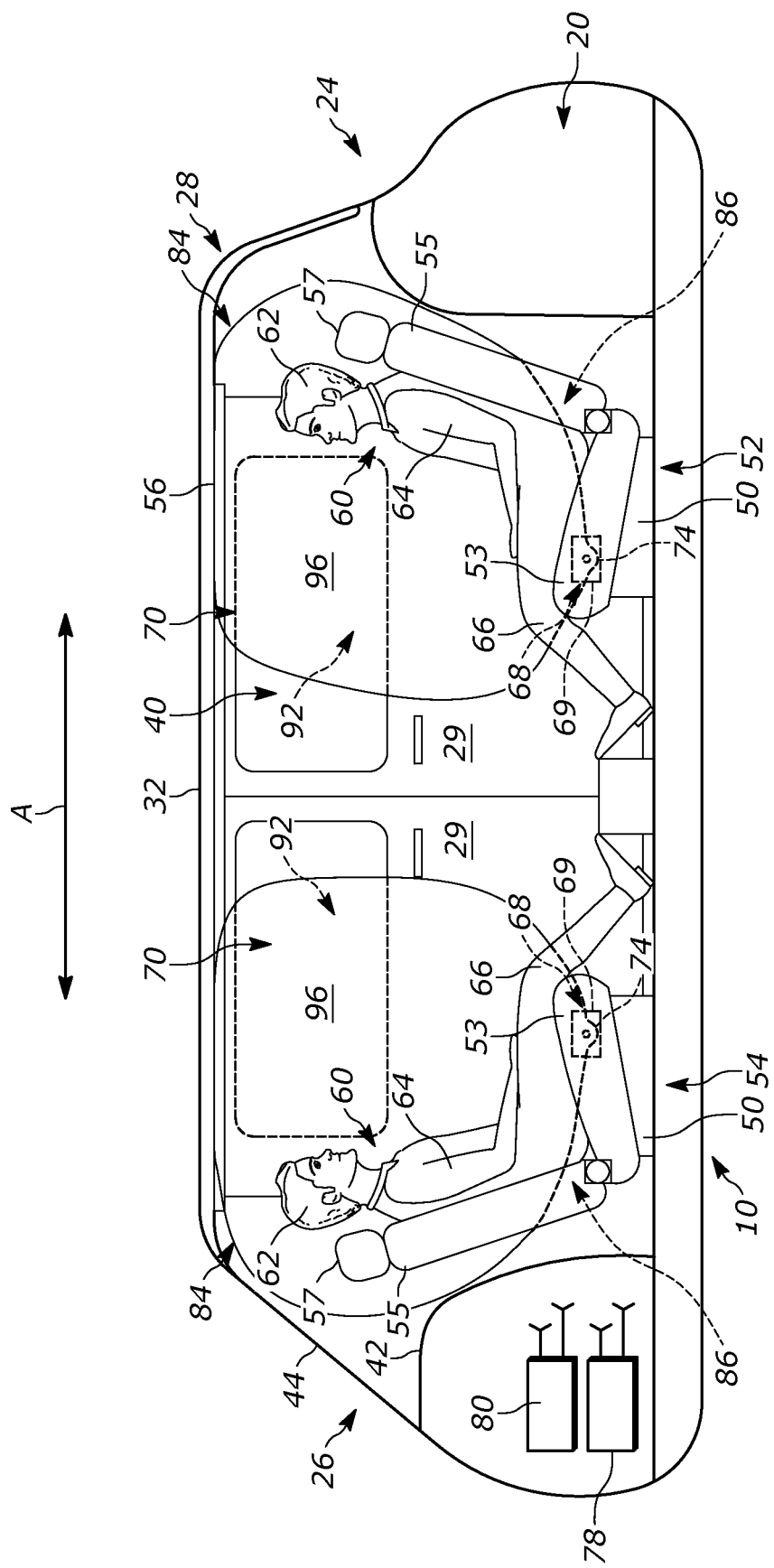
FIG. 4 is a schematic illustration of the cabin with the airbag in a deployed condition.
Figure 5:
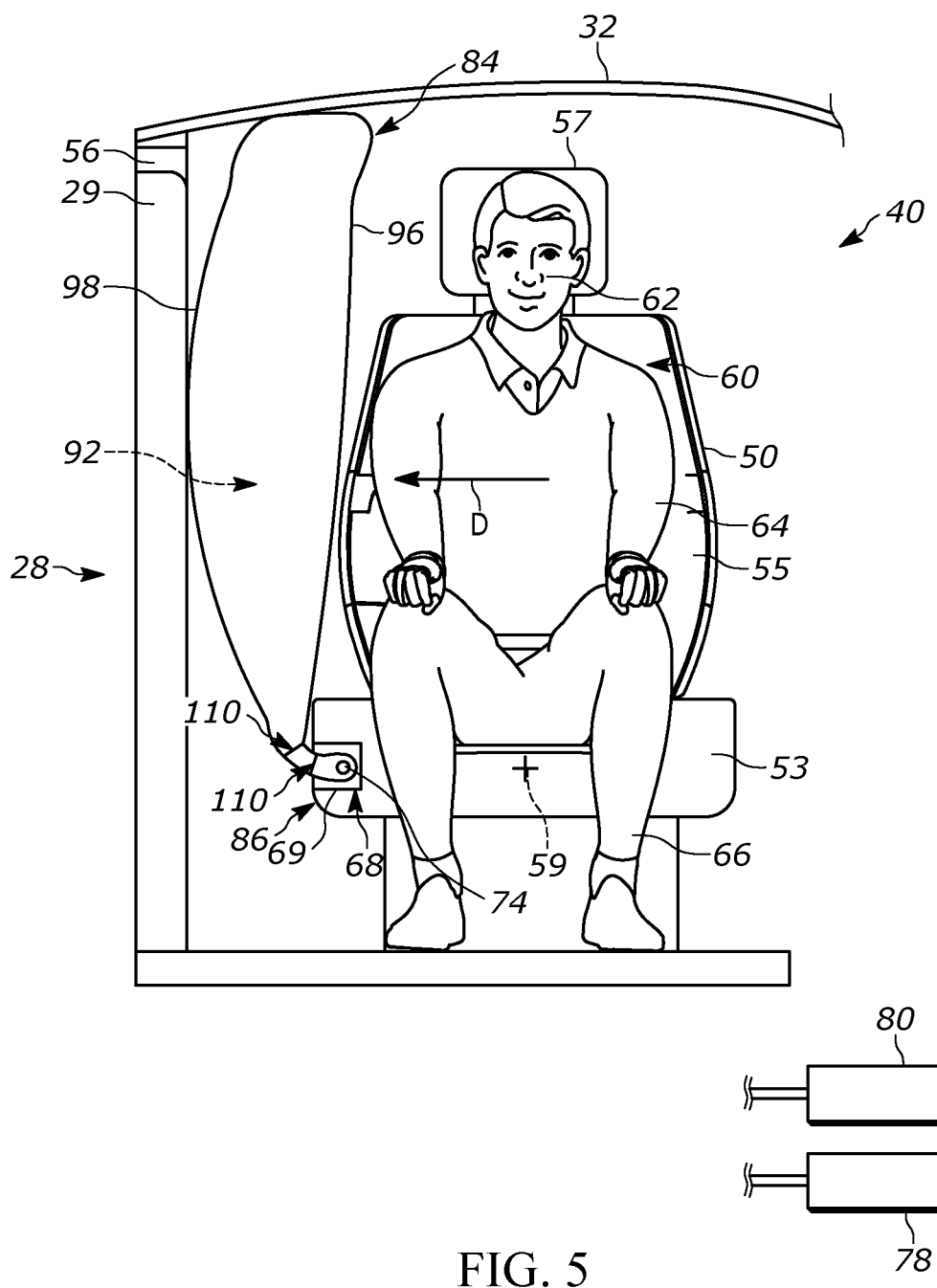
FIG. 5 is a front view of a seat in the cabin of FIG. 4.

As shown in FIGS. 4-5, the airbag 70 inflates from its stored locations in the base 53 to its deployed condition. The airbag 70, when deployed, extends from a lower end 82 to an upper end 84 and defines an inflatable volume 92. The lower end 82 is connected to the seat 50 and fluidly connected to the inflator 74. A first side 96 faces towards the occupant 60 in the associated seat 50. A second side 98 faces away from the occupant 60.

The trajectory of the airbag 70 deployment can be controlled by a deflecting member (not shown) provided on the base 53 adjacent the module 68. The door of the housing 69, for example, can pivot away from the housing 69 to not only allow the airbag 70 to deploy but can remain connected to the housing so as to deflect or guide deployment in a prescribed manner. A separate door or ramp (not shown) connected to the housing 69 or base 53 can also be used to control the airbag 70 deployment trajectory.

In one example, one or more tethers are provided on the lower end 82 of the airbag 70 to help direct airbag deployment away from the base 53 sufficient to allow the airbag to then deploy unimpeded upwards towards the roof 32. As shown, a pair of tether 110 are connected to the interior of the lower end 82 or airbag 70. In particular, each tether 110 extends in the inboard-outboard direction of the vehicle 20 and has one end secured to the first side 96 and another end secured to the second side 98. More of fewer tethers 110 than the pair shown (including zero) can alternatively be provided.

In its deployed condition, the airbag 70 is configured to extend at least the entire depth of the seat 50 and upward from the seat to a position sufficient to receive and help protect the occupant's head 62 and upper torso 64. As shown, the airbag 70 extends both forward and rearward of the seat 50 and the upper end 84 is configured to engage the roof 32. The extent of the airbag 70 deployment vertically and/or horizontally (as shown in FIG. 4) can be adjusted in order to adjust the coverage of the airbags. To this end, the inflated depth of the airbag 70 (in the direction of the centerline 22) can be adjusted to accommodate any degree of reclining of the seat back 55, including no reclining.

That said, a side crash resulting in outboard occupant 60 movement causes the occupant to move laterally toward the airbag 70, as indicated generally by the arrow D in FIG. 5. Advantageously, as shown in FIGS. 4-5, the engagement between the lower end 82 of the airbag 70 and the base 53, in combination with the engagement of the airbag with vehicle 20 side structure, produces reaction forces extending in directions opposite the impact forces applied to the airbag by the penetrating occupant 60. As a result, the seat 50 (particularly the base 53) and the side structure cooperate to act as the reaction surface for the airbag 70. The airbag 70 therefore provides a ride-down effect on the moving occupant 60 to thereby help reduce loads thereon. To this end, the airbag 70 accommodates the moving occupant 60 by providing a more gradual reaction force in response to occupant penetration.

That said, the connection between the lower end 82 and the seat base 53, in combination with the airbag 70 deployment between the seat and side structure, act to limit or restrict movement of the airbag away from the occupant 60 in response to occupant penetration. In other words, the seat 50 and side structure cooperate to help prevent or limit airbag 70 movement in the direction D.

From the above, it will be appreciated that the example configurations of FIGS. 1-5 illustrate that the airbag 70 is configured to utilize the vehicle seat 50 and vehicle side structure as a reaction surface regardless of whether the seats are in the conventional or the unconventional seating arrangement, reclined, and/or rotated. In other words, positioning the airbag 70 in the seat 50 allows the module 68 to rotate with the occupant 60. In such circumstances, the airbag will rely on the seat and the outboard side structure of the vehicle By "reaction surface," it is meant that it is the vehicle seats 50 and side structure that support the airbags 70 against movement in response to the impacting occupants 60. This allows the airbags 70 to absorb impact forces of the occupants 60 and provide the desired ride-down effect.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. To this end, it will also be appreciated that features shown and illustrated in any one example can likewise be added to/interchanged with features in any other example.

I claim:

1. A restraint system for helping to protect an occupant of a vehicle having a roof and side structure defining a cabin with a seat for the occupant, comprising:
   an airbag having a stored condition within the vehicle seat and being inflatable to deploy upwards in the cabin to a deployed condition between the occupant and the side structure, the airbag extending from an upper end positioned engaging the roof to a lower end positioned adjacent a base of the seat, the airbag extending in a forward-rearward direction of the vehicle sufficient to span the entire depth of the seat in the forward-rearward direction so as to be positioned between the occupant and the side structure in an upright seating position and a reclined seating position.

2. The restraint system recited in claim 1, wherein the airbag is stored within a base of the seat.

3. The restraint system recited in claim 1, wherein the airbag is stored in a seatback of the seat.

4. The restraint system recited in claim 1, wherein the airbag is stored in a head rest of the seat.

5. The restraint system recited in claim 1, further comprising at least one internal tether connected to the lower end of the airbag for directing airbag deployment around the seat.

6. The restraint system recited in claim 5, wherein the at least one tether comprises multiple tethers each having first and second ends connected to interior surfaces of the airbag.

7. The restraint system recited in claim 5, wherein each of the at least one tether extends in an inboard-outboard direction of the vehicle.

8. The restraint system recited in claim 1, wherein the airbag is configured to use the seat as a reaction surface.

9. The restraint system recited in claim 1, wherein the airbag is configured to use the vehicle side structure as a reaction surface.

10. An airbag module comprising the restraint system of claim 1 and further comprising a housing configured to be mounted in the vehicle seat and an inflator for providing inflation fluid for inflating the airbag.

11. The restraint system recited in claim 1, further comprising:
   a sensor for sensing the occurrence of an event for which deployment of the airbag is desired and producing a signal indicative thereof; and
   a controller connected to the sensor and, in response to receiving the signal, actuating an inflator to inflate the airbag to the deployed condition.

12. A restraint system for helping to protect an occupant of a vehicle having a roof and side structure defining a cabin with a seat for the occupant, comprising:
   an airbag having a stored condition within a seat base of the seat and being inflatable to deploy upwards in the cabin to a deployed condition between the occupant and the side structure, the airbag extending from an upper end configured to engage the roof to a lower end extending into the seat base, the airbag extending in a forward-rearward direction of the vehicle sufficient to span the entire depth of the seat in the forward-rearward direction; and
   at least one internal tether connected to the lower end of the airbag for directing airbag deployment around the seat base, wherein the at least one tether is connected at a location where the lower end extends into the seat base.

13. The restraint system recited in claim 12, wherein the at least one tether comprises multiple tethers each having first and second ends connected to interior surfaces of the airbag.

14. The restraint system recited in claim 12, wherein each of the at least one tether extends in an inboard-outboard direction of the vehicle.

15. The restraint system recited in claim 12, wherein the airbag is configured to use the seat base as a reaction surface.

16. The restraint system recited in claim 12, wherein the airbag is configured to use the vehicle side structure as a reaction surface.

17. An airbag module comprising the restraint system of claim 12 and further comprising a housing configured to be mounted in the vehicle seat and an inflator for providing inflation fluid for inflating the airbag.

18. The restraint system recited in claim 12, further comprising:
   a sensor for sensing the occurrence of an event for which deployment of the airbag is desired and producing a signal indicative thereof; and
   a controller connected to the sensor and, in response to receiving the signal, actuating an inflator to inflate the airbag to the deployed condition.

19. The restraint system recited in claim 5, wherein the at least one tether is connected at a location where the lower end extends into the seat base.

* * * * *